(12) United States Patent
Kimura et al.

(10) Patent No.: US 7,808,197 B2
(45) Date of Patent: Oct. 5, 2010

(54) CONTROL APPARATUS FOR OPENING/CLOSING MEMBER OF VEHICLE AND CONTROL METHOD FOR OPENING/CLOSING MEMBER OF VEHICLE

(75) Inventors: Shogo Kimura, Toyota (JP); Hiroyuki Mizutani, Nisshin (JP); Yoshinori Iwase, Chiryu (JP); Koichi Takahashi, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 343 days.

(21) Appl. No.: 11/806,219

(22) Filed: May 30, 2007

(65) Prior Publication Data

US 2008/0001563 A1    Jan. 3, 2008

(30) Foreign Application Priority Data

Jun. 20, 2006    (JP)    ............................. 2006-170501

(51) Int. Cl.
*H02P 1/04*    (2006.01)
*H02P 7/00*    (2006.01)
*B60J 5/00*    (2006.01)
*E05F 15/02*    (2006.01)

(52) U.S. Cl. ...................... 318/469; 318/280; 318/283; 318/443; 318/445; 318/466; 318/468; 318/478; 296/146.4; 49/340

(58) Field of Classification Search ................ 318/469, 318/478, 466, 280, 283, 468, 443, 445; 296/146.4; 49/340
See application file for complete search history.

(56) References Cited

U.S. PATENT DOCUMENTS 5,530,329 A * 6/1996 Shigematsu et al. ......... 318/469

| 5,982,126 | A | * | 11/1999 | Hellinga et al. | ............. 318/468 |
|---|---|---|---|---|---|
| 6,256,932 | B1 | * | 7/2001 | Jyawook et al. | ............... 49/503 |
| 6,435,600 | B1 | * | 8/2002 | Long et al. | .................. 296/155 |
| 6,946,811 | B2 | * | 9/2005 | Kikuta et al. | ............... 318/468 |
| 7,038,413 | B2 | * | 5/2006 | Onozawa et al. | ............ 318/443 |
| 7,170,244 | B2 | * | 1/2007 | Choby | ........................ 318/280 |
| 2001/0033086 | A1 | * | 10/2001 | Yuge et al. | ..................... 296/56 |
| 2002/0084668 | A1 | * | 7/2002 | Yamagishi et al. | ............ 296/76 |
| 2002/0088180 | A1 | * | 7/2002 | Yokomori | ...................... 49/31 |
| 2002/0093301 | A1 | * | 7/2002 | Itami et al. | ................... 318/452 |
| 2003/0177698 | A1 | * | 9/2003 | Haag et al. | ..................... 49/342 |
| 2004/0008001 | A1 | * | 1/2004 | Kikuta et al. | ............... 318/466 |
| 2004/0123525 | A1 | * | 7/2004 | Suzuki et al. | ................. 49/360 |

(Continued)

FOREIGN PATENT DOCUMENTS

JP    2002-295123 A    10/2002

(Continued)

*Primary Examiner*—Jeffrey Donels
*Assistant Examiner*—Christina Russell
(74) *Attorney, Agent, or Firm*—Buchanan Ingersoll & Rooney PC

(57) ABSTRACT

A control apparatus for an opening/closing member of vehicle includes a driving member for moving an opening/closing member for a vehicle, speed detecting means for detecting a drive speed of the driving member and control means for calculating a current speed difference between the drive speed of the driving member and a target drive speed, for calculating a current change amount between the calculated current speed difference and a previous speed difference calculated a predetermined time before, for calculating a current deviation by integrating the current change amount and for detecting an entrapment of an object by comparing the calculated deviation to a predetermined threshold.

20 Claims, 5 Drawing Sheets

U.S. PATENT DOCUMENTS

| | | | |
|---|---|---|---|
| 2005/0067990 A1* | 3/2005 | Matsui et al. | 318/478 |
| 2005/0179409 A1* | 8/2005 | Honma et al. | 318/62 |
| 2006/0006692 A1* | 1/2006 | Takahashi et al. | 296/146.4 |

FOREIGN PATENT DOCUMENTS

| | | |
|---|---|---|
| JP | 2002-295127 A | 10/2002 |
| JP | 2005-232753 A | 9/2005 |

* cited by examiner

CONTROL APPARATUS FOR OPENING/CLOSING MEMBER OF VEHICLE AND CONTROL METHOD FOR OPENING/CLOSING MEMBER OF VEHICLE

CROSS REFERENCE TO RELATED APPLICATIONS

This application is based on and claims priority under 35 U.S.C. §119 to Japanese Patent Application 2006-170501, filed on Jun. 20, 2006, the entire content of which is incorporated herein by reference.

FIELD OF THE INVENTION

The present invention relates to a control apparatus for an opening/closing member of vehicle and a control method for the opening/closing member of vehicle.

BACKGROUND

As a control apparatus for an opening/closing member of vehicle adapted to, for example, an automobile, the control apparatus for controlling an electric motor for opening and closing the opening/closing member has been known so far. Specifically, the control apparatus controls the electric motor in a manner where a speed of the electric motor reaches a predetermined target speed. Further, such control apparatus detects an entrapment of an object.

Specifically, the control apparatus detects the entrapment of the object when the speed of the electric motor is reduced so as to be equal to or less than a predetermined threshold which used for detecting an entrapment. When the entrapment is detected, the opening/closing member, which has been moved in one direction, is controlled so as to move in an opposite direction, as a result, an excessive pressure from the opening/closing member is not applied to the object.

When the entrapment is detected on the basis of the speed reduction of the electric motor as mentioned above, an entrapment may be mistakenly detected (an error of the entrapment detection) due to effects from its environment and disturbance. In order to improve an accuracy of the entrapment detection, various apparatuses have been proposed so far (e.g., apparatuses disclosed in JP 2005232753A).

JP 2005232753A disclosed a control apparatus for an opening/closing member of vehicle by which an entrapment is detected by calculating a speed difference (angular acceleration) between a current speed of the electric motor and a previous speed calculated a predetermined time before, by calculating a integration value by integrating the; speed difference, and by comparing the calculated the integration value to a predetermined threshold. As a result, possibility of error of the entrapment detection due to an instantaneous pulsing motion of the speed of the electric motor, the pulsing motion being caused by the disturbance, is lowered. However, according to the disclosed control apparatus, because the target speed of the electric motor is reduced in accordance with, for example, the position of the opening/closing member of the vehicle, and the speed of the electric motor is reduced so as to follow the target speed, the integration value is also reduced.

A need thus exists to provide a control apparatus for an opening/closing member of vehicle by which an accuracy of the entrapment detection is improved.

SUMMARY OF THE INVENTION

According to an aspect of the present invention, a control apparatus for an opening/closing member of vehicle includes a driving member for moving the opening/closing member, speed detecting means for detecting a drive speed of the driving member and control means for calculating a current speed difference between the drive speed of the driving member and a target drive speed, for calculating a current change amount between the calculated current speed difference and a previous speed difference calculated a predetermined time before, for calculating a current deviation by integrating the current change amount and for detecting an entrapment of an object by comparing the calculated deviation to a predetermined threshold.

According to another aspect of the present invention, control method for the opening/closing member of vehicle includes a speed difference calculating step for calculating a: current speed difference between a drive speed of a driving member by which an opening/closing member for a vehicle is moved and a predetermined target drive speed, a speed difference change amount calculating step for calculating a current change amount, between the current speed difference and a previous speed difference calculated a predetermined time before, a deviation calculating step for calculating a current deviation by integrating the current change amount and a detecting step for detecting an entrapment of an object by comparing the calculated deviation to a predetermined threshold.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
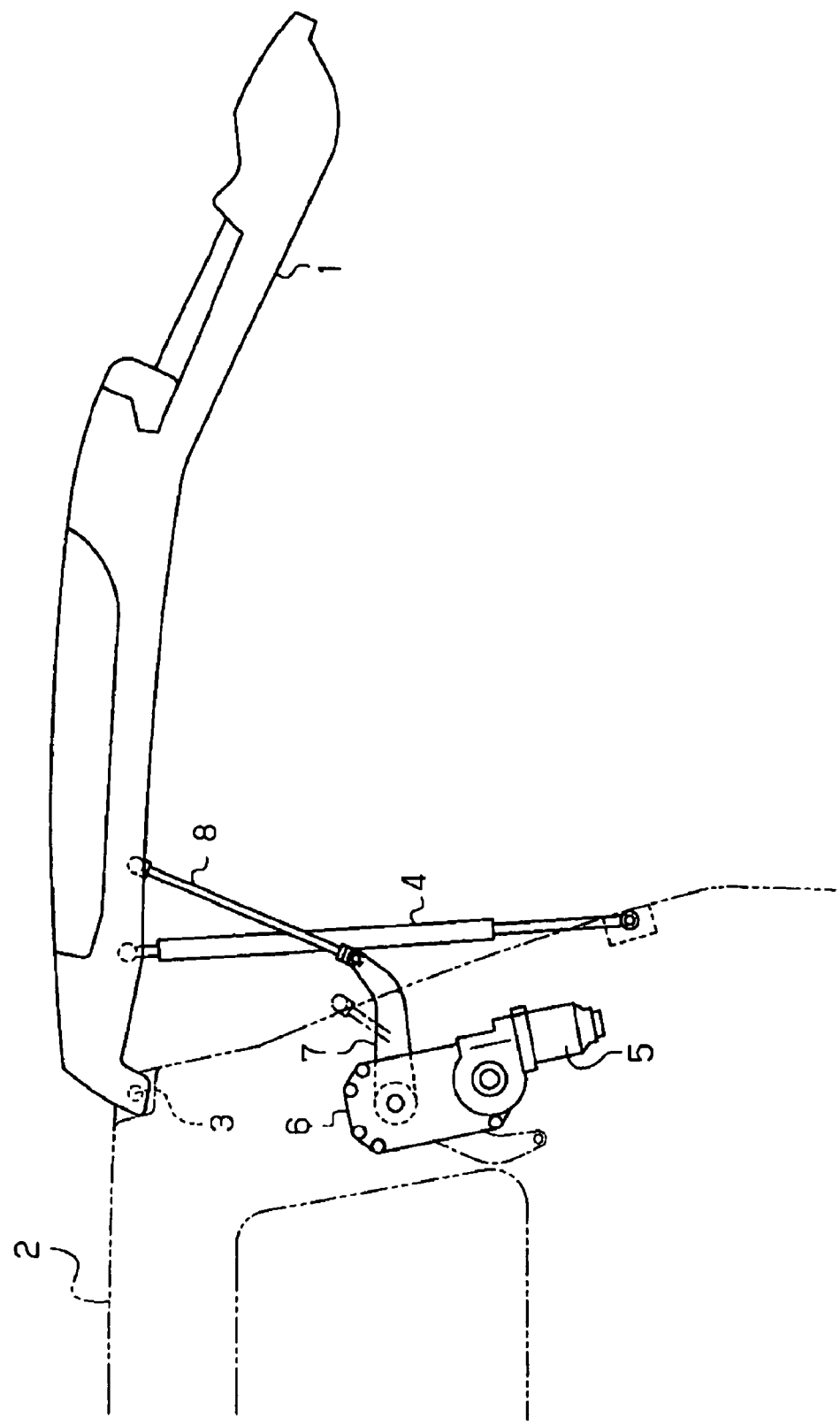
FIG. 1 illustrates a side view indicating an embodiment of the present invention.

An embodiment of the present invention will be explained in accordance with the attached drawings. FIG. 1 illustrates a side view schematically indicating a back door (tail gate) 1 serving as an opening/closing member for a vehicle and a surrounding structure thereof. As illustrated in FIG. 1, the back door 1 is attached to a vehicle 2 at a rear portion thereof by means of a door hinge 3 so as to be movable (e.g., rotatable) relative to the door hinge 3. The back door 1 is supported by a gas damper 4. The back door 1 is opened in a manner where it is pushed up so as to rotate relative to the door hinge 3 located at an upper edge of the vehicle 2. The gas damper 4 applies a gas reactive force to the back door 1 in order to assist the back door 1 to be pushed up.

An electric motor 5, serving as a driving member, is provided at the rear portion of the vehicle 2, and a rotational shaft of the electric motor 5 is connected to an arm member 7, which is formed in a long shape, by means of a deceleration mechanism 6. Further, an end portion of the arm member 7 is connected to one end of a rod 8 so as to be rotatable. The other end of the rod 8 is connected to the back door 1 so as to be rotatable. In this configuration, once the electric motor 5 (the rotation shaft of the electric motor 5) is rotated, the rotation of the electric motor 5 is decelerated by the deceleration mechanism 6, and the decelerated rotation is transmitted to the arm member 7 in order to rotate the arm member 7. The rod 8 is pushed and pulled in accordance with the rotation of the arm member 7, as a result, the back door 1 is rotated in an opening direction or in a closing direction. The back door 1 is moved between a fully closed position, at which the back door is fully closed, and a fully opened position, at which the back door is fully opened.

Figure 2:
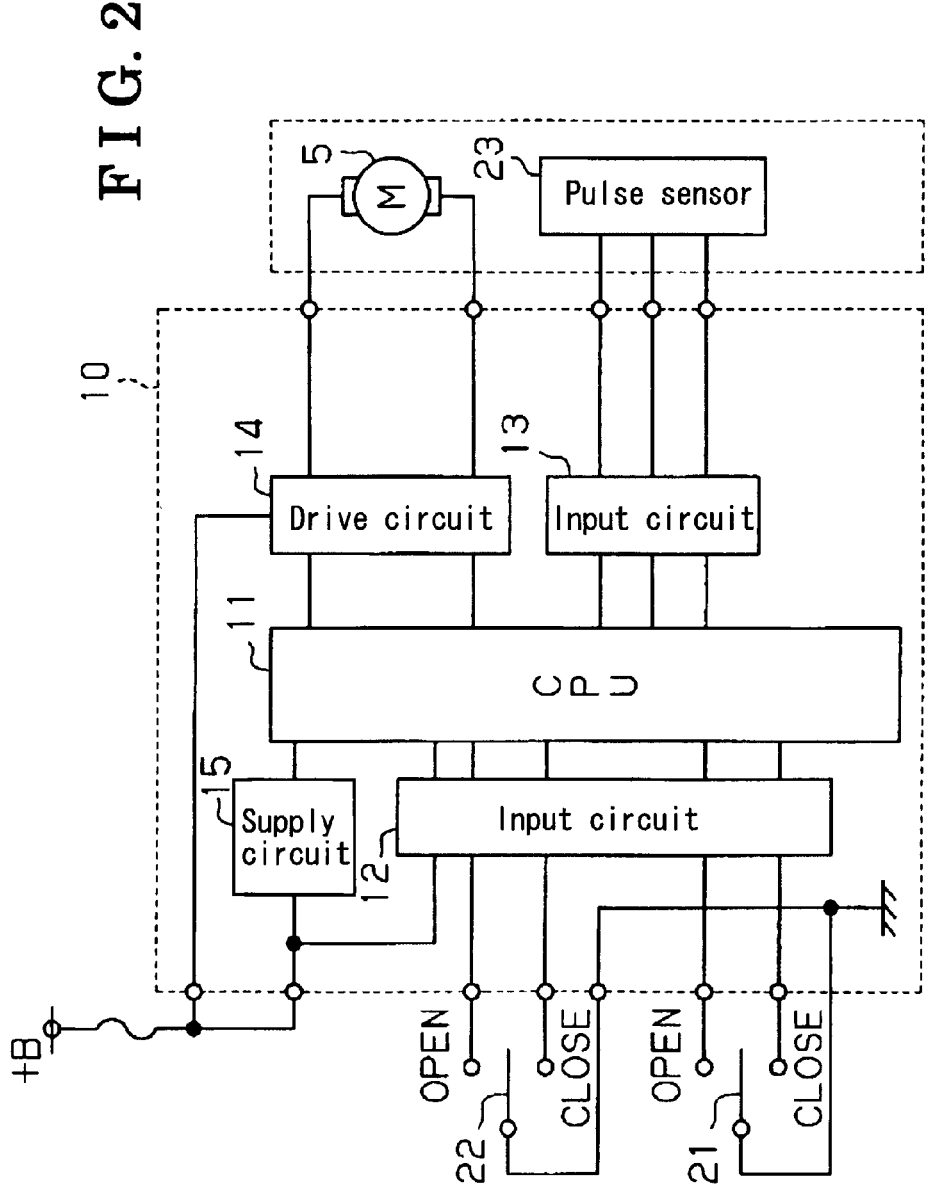
FIG. 2 illustrates a block diagram indicating an electric configuration of the embodiment.

Next, an electrical configuration of a control apparatus 10 related to a control for opening and closing the back door 1 will be explained. FIG. 2 illustrates a block diagram indicating an electrical configuration of the control apparatus 10 provided at the vehicle 2 and a surrounding structure thereof. As illustrated in FIG. 2, the control apparatus 10 includes a CPU (central processor) 11, input circuits 12 and 13 and a drive circuit 14, The CPU 11 serving as a control means. Each of the input circuits 12 and 13 and the drive circuit 14 is electrically connected to the CPU 11. The CPU 11 integrally includes functions of a ROM, a RAM and a timer. Specifically, the ROM stores various control programs related to a calculation process of the CPU 11, and the RAM temporary stores various data (calculation process results or the like). Power supply voltage, which is transformed of battery voltage +B from a battery into a predetermined voltage (e.g., 5V) via a power supply circuit 15, is supplied to the CPU 11.

The CPU 11 inputs the battery voltage +B via the input circuit 12 and detects an actual voltage V of the battery on the basis of the battery voltage +B. Further, the CPU 11 is connected to an exterior operation switch 21 via the input circuit 12 and detects whether or not the back door 1 is operated by a user from the exterior of the vehicle, on the basis of a signal from the exterior operation switch 21. Further, the CPU 11 is connected to an interior operation switch 22 via the input circuit 12 and detects whether or not the back door 1 is operated by the user from the interior of the vehicle, on the basis of a signal from the interior operation switch 22.

Furthermore, the CPU 11 is connected to a pulse sensor 23, serving as a speed detecting means, via the input circuit 13. The CPU 11 detects a rotational angle and a speed N (drive speed) of the electric motor 5 on the basis of a pulse signal from the pulse sensor 23. Specifically, the pulse sensor 23 includes a pair of hall elements, which are located at an outer peripheral surface of a ring-shaped magnet being rotated by the electric motor 5, so as to face each other, the outer peripheral surface having north poles and south poles alternating per predetermined angle. As the electric motor 5, serving as a magnetic element, rotates by the predetermined angle, the hall elements output pulse signals each having a different phase. Thus, the CPU 11 detects the rotational angle of the electric motor 5 by counting a rising edge (or a falling edge) of, for example, one of the pulse signals, detects a speed N of the electric motor 5 on the basis of an interval of the rising edge (or the falling edge) and detects a rotational direction (a normal direction or a reverse direction) on the basis of a difference of the phases of the both pulse signals. Each of the rotational angle, the speed N and the rotational direction of the electric motor 5 basically correspond to each of the position, the speed and the moving direction of the back door 1 respectively.

The electric motor 5 is connected to the drive circuit 14, and the battery voltage +B from the battery is supplied to the drive circuit 14. On the basis of an output duty value DUTY from the CPU 11, the drive circuit 14 switches a polar character of the battery voltage +B supplied to the electric motor 5 and changes a ratio (duty ratio) between "On" for supplying the battery voltage +B and "Off" for not supplying the battery voltage +B. Specifically, the rotational direction (the normal direction or the reverse direction) of the electric motor 5 is controlled by controlling the polar character of the battery voltage +B supplied thereto on the basis of the output duty value DUTY from the CPU 11. Further, a supplied average voltage, namely the speed N, is controlled by duty control (PWM control). In this embodiment, a target speed Nt, serving as a target drive speed, is preset corresponding to the rotational angle of the electric motor 5 (position of the back door 1). Further, the CUP 11 controls (feed back control) the output duty value DUTY in a manner where the calculated speed N becomes equal to the target speed Nt.

Figure 3:
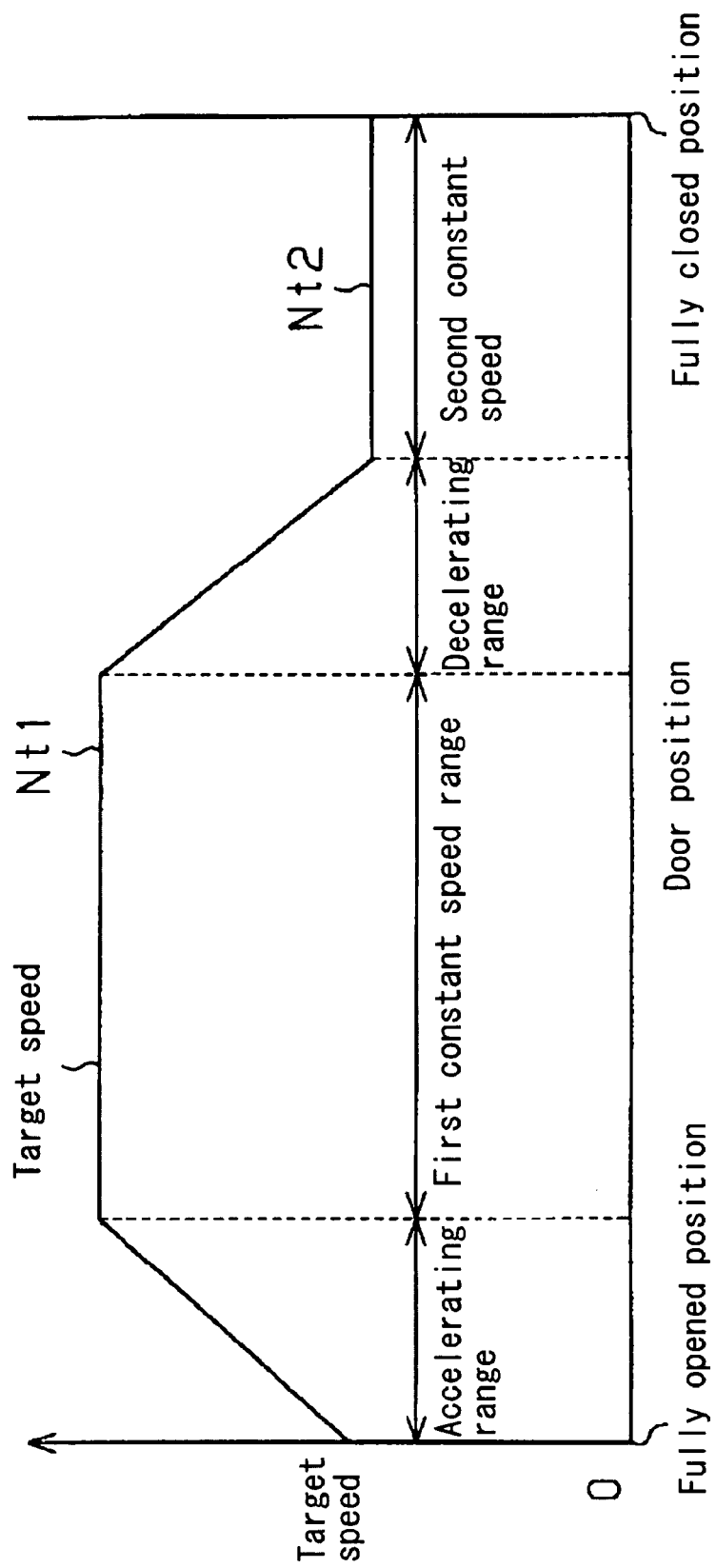
FIG. 3 illustrates a graph indicating a relation between a door position and a target speed.

The target speed Nt according to the embodiment will be explained in detail. FIG. 3 illustrates a relation between the position of the back door 1 being moved from the fully opened position to the fully closed position, and the target speed Nt. As illustrated in FIG. 3, the target speed Nt is preset depending on the position of the back door 1. Specifically, a range, in which the back door 1 is moved, is divided into four ranges; an accelerating range, a first constant speed range, a decelerating range and a second constant speed range. In the accelerating range, the target speed Nt linearly (proportionally) increases in accordance with a closing operation of the back door 1 starting from the fully opened position. In the first constant speed range, the target speed Nt keeps the target speed Nt in the accelerating range and is maintained to be a constant target speed Nt1. In the decelerating range, the target speed Nt keeps the targetispeed Nt (Nt1) in the first constant speed range and is linearly decreased in accordance with the closing operation of the back door 1. In the second constant speed range, the target speed Nt keeps the target speed Nt in the decelerating range and is maintained to be a constant target speed Nt2. By changing the target speed Nt depending on the position of the back door 1, the opening/closing operation of the back door 1 is executed with a combination of fast and slow speeds in order to provide a sense of exclusivity, at the same time, at a final stage of the closing operation of the back door 1, at which a possibility of the entrapment of the object by the back door 1 is relatively high, the speed of the electric motor 5, in other words the speed of the back door 1, is reduced so that a load applied to the object by the back door 1 upon the entrapment is reduced.

Further, during an opening operation of the back door 1 from the fully closed position to the fully opened position the target speed Nt may be changed depending on the position of the back door 1. In this configuration, at a final stage of the opening operation of the back door 1 at which a possibility where the object is entrapped by the back door 1 is relatively high, the speed of the electric motor 5, in other words the speed of the back door 1, is reduced so that a load applied to the object by the back door 1 upon the entrapment is reduced. The entrapment of the object during the closing operation of the back door 1 may happen when a luggage or human body is located between the back door 1 and the rear portion of the vehicle 2. This entrapment may be defined as a contact of the back door 1 to the luggage or the human body. The entrapment of the object during the opening operation of the back door 1 may happen when an obstacle or human body is located at the rear of the vehicle 2. This entrapment is defined as a contact of the back door 1 to the obstacle or the human body.

Next, a detecting manner by the CPU 11 for detecting the entrapment of the object will be explained. When the obstacle or human happens to be at the rear of the vehicle 2 during the opening operation of the back door 1, the CPU 11 may detect an entrapment of the object. Further, when the luggage or human happens to be between the back door 1 and the rear portion of the vehicle 2 during the closing operation of the back door 1, the CPU 11 may detect an entrapment of the object. For example, once the entrapment of the object is detected, the CPU 11 stops the electric motor 5 so that the operation of the back door 1 is stopped in order to avoid the entrapment, or reverses the electric motor 5 so that the back door 1 is reversed so as to be moved in the opposite direction in order to avoid the entrapment.

Figure 4:
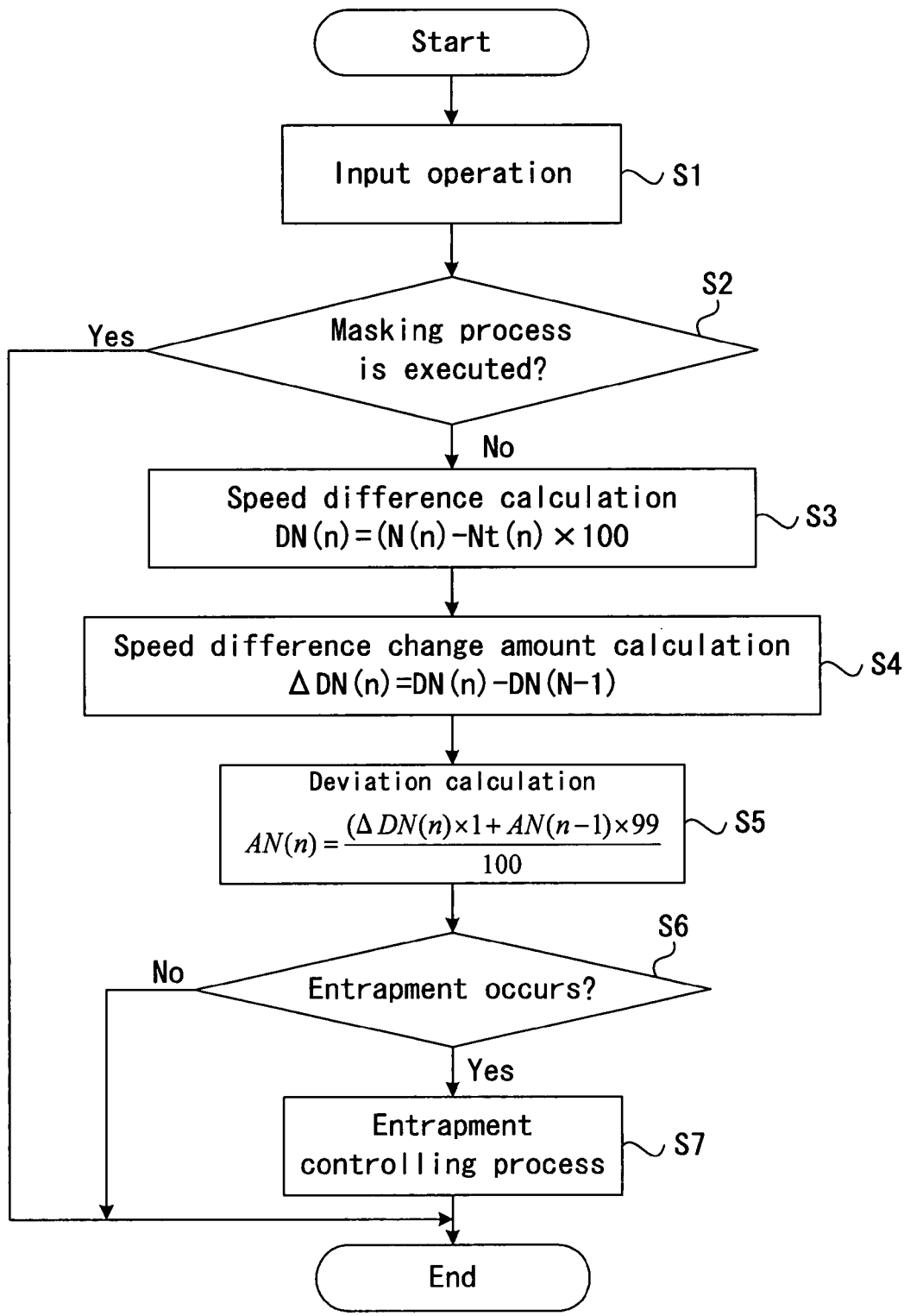
FIG. 4 illustrates a flowchart indicating a control of the embodiment.

FIG. 4 illustrates a flowchart indicating a detecting manner of the entrapment during the closing operation of the back door 1 is executed. This process is repeated by interrupting a routine illustrated in the flowchart each predetermined time until the electric motor 5 is stopped, after the closing operation of the back door 1 is started when an intention of the closing operation of the back door 1 is detected on the basis of the signal from the exterior operation switch 21 or the interior operation switch 22. At this point, the output duty value DUTY is controlled (feed back control) by the CPU 11 in a manner where the speed N of the electric motor 5 indicated in FIG. 3 becomes equal to the target speed Nt, as mentioned above.

Once the process moves to this routine, the CPU 11 executes an input operation of various data in Step S1. Then, the process goes to Step S2. In S2, the CPU 11 determines whether or not a masking process has been executed in order to prohibit the detection of the entrapment. This masking process is executed in order to avoid an error of the entrapment detection caused by, for example, an unstable speed change of the electric motor 5 at a starting point of the closing operation of the back door 1. Such speed change occurs being influenced by a gear backlash occurring right after the start of the electric motor 5 and by a temperature characteristic change. For example, the CPU 11 determines that the masking operation is executed when a elapsed time after the electric motor 5 is started does not reach a predetermined time, when the rotational angle (corresponding to an opening/closing amount of the back door 1) after the electric motor is started does not reach a predetermined rotational angle, or when the speed N of the electric motor 5 does not reach a predetermined speed that indicates the electric motor 5 is in a stable condition. At this point, the CPU 11 does not execute the entrapment detection, and the following processes are temporally stopped.

On the other hand, when the CPU 11 determines in S2 that the masking operation is not executed, the CPU 11 proceeds to Step S3 and executes a calculation of a speed difference. Specifically, the CPU 11 calculates a speed difference DN(n) (e.g., current speed difference) by multiplying a value, which is obtained by subtracting a target speed Nt(n) from the current speed N(n), by 100 as expressed in a following formula. The current speed N(n) is detected in a current calculation cycle, and the target speed Nt(n) is set corresponding to a current position of the back door. In this process, Step S3 corresponds to a speed difference calculating step.

$$DN(n)=(N(n)-Nt(n))\times 100$$

Further, the CPU 11 proceeds to Step S4. In S4, the CPU 11 executes a speed difference change amount calculation. Specifically, the CPU 11 calculates a speed difference change amount ΔDN(n) (e.g., current change amount) by subtracting a previous speed difference DN(n−1), calculated in a previous calculation cycle, from the current speed difference DN(n) calculated in S3 as expressed in a following formula. In this process, Step S4 corresponds to a speed difference change amount calculating step.

$$\Delta DN(n)=DN(n)-DN(n-1)$$

Continuously, the CPU 11 proceeds to Step S5 and executes a deviation calculation by integrating and averaging the speed difference change amount ΔDN. Specifically, the CPU 11 calculates a deviation AN(n) (e.&, current deviation) by averaging the current speed difference change amount ΔDN(n) calculated in S4 and a deviation AN(n−1) calculated in the previous calculation cycle, with weighting them at a ratio of 1:99 as expressed in a following formula. In this process, Step S5 corresponds to a deviation calculating step.

$$AN(n)=(\Delta DN(n)\times 1+AN(n-1)\times 99)/100$$

An initial value of the deviation AN is set to "0", and the deviation AN is updated each calculation cycle in a manner where the speed difference change amount ΔDN is sequentially reflected to the deviation AN. In other words, because the deviation AN is calculated by integrating and averaging the past speed difference change amounts ΔDN, even when a instantaneous pulsing motion is generated at the speed N of the electric motor S (generated at the speed difference DN) due to a disturbance or the like, such pulsing motion is appropriately absorbed during the calculation of the deviation AN. Further, because the deviation AN is calculated by use of the speed difference change amount ΔDN on the basis of the speed difference DN between the speed N and the target speed Nt, the level of the reflection of the change amount of the target speed Nt to the deviation AN can be reduced, the target speed Nt corresponding to the position of the back door. In this configuration, only the speed difference DN (speed N) changing rapidly and continuously is basically stored as the deviation AN.

After calculating the deviation, the CPU 11 executes an entrapment determination in S6. Specifically, the CPU 11 determines the entrapment by comparing the current deviation AN(n) to the predetermined threshold ANth. In this process, Step S6 corresponds to a detecting step. The threshold ANth is set to a value by which the entrapment is appropriately detected on the basis of the deviation AN(n). The CPU 11 terminates the process when the deviation AN(n) becomes equal to or more than the threshold ANth. On the other hand, when the deviation AN(n) becomes lower than the threshold ANth, the CPU 11 determines that the deviation AN is significantly reduced, in other words, the CPU 11 determines that a rapid and continuously change occurs at the speed N, as a result, an entrapment is detected. The. CPU 11 proceeds to step S7 and executes an entrapment controlling process. Specifically, the CPU 11 stops the movement of the back door 1 by stopping the electric motor 5, or controls the movement of the back door 1 so as to move in the opposite direction by reversing the rotation of the electric motor 5, in order to eliminate the entrapment.

Figure 5:
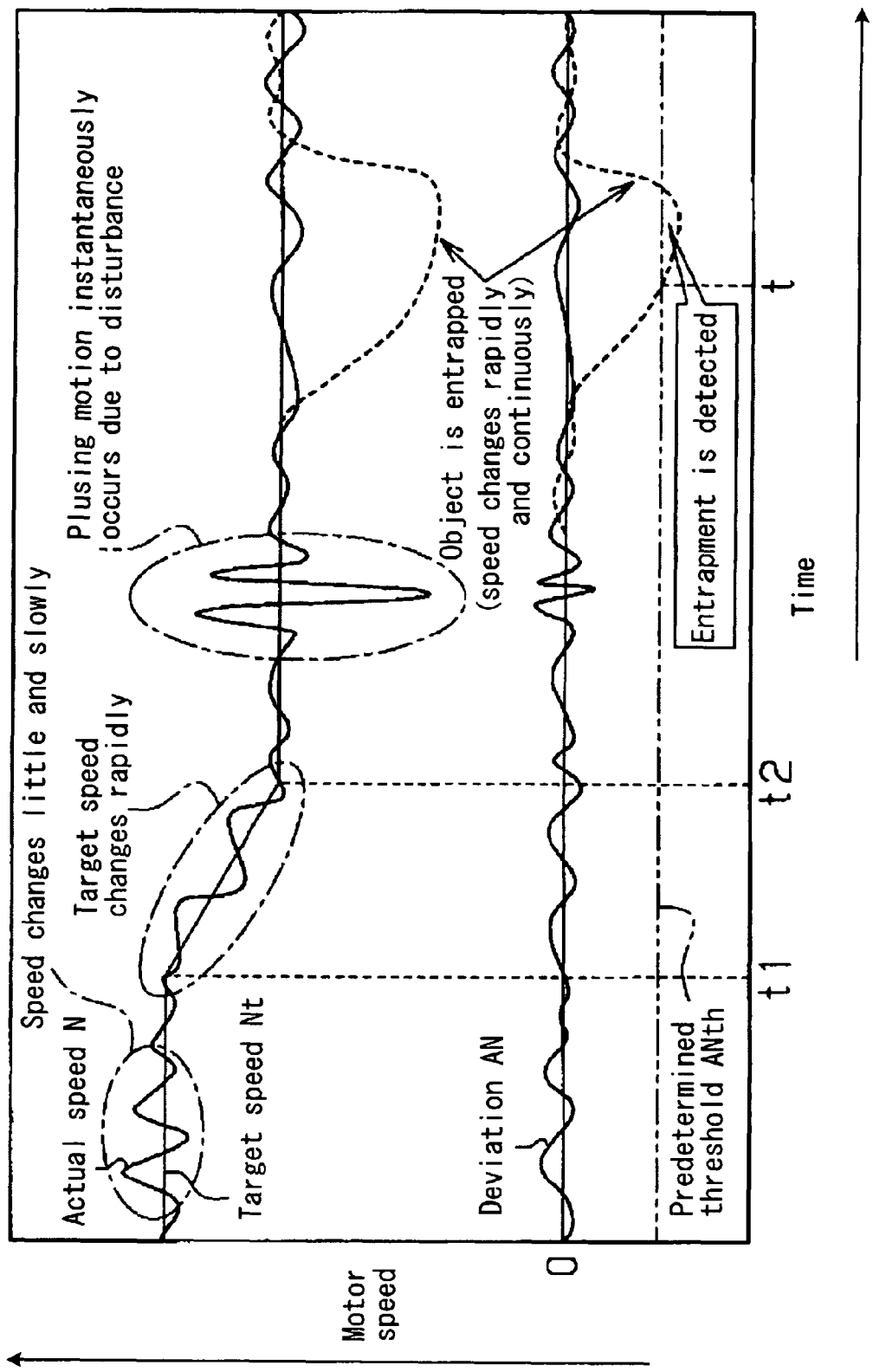
FIG. 5 illustrates a time chart indicating an operation of the embodiment.

FIG. 5 illustrates a time chart indicating variations of the speed N (actual speed N) and the deviation AN of the electric motor 5 while the back door 1 is moved so as to be in a fully closed state in accordance with the closing operation of the back door 1, and also indicates the target speed Nt varying as time passes in accordance with the position of the back door (the rotational angle of the electric motor 5) at the time. The speed N of the electric motor 5 basically varies so as to follow the target speed Nt. Further, during a time period between a time t1 and a time t2, in which the target speed Nt of the electric motor 5 has been decreasing the speed N of the electric motor 5 is controlled in a manner where the change amount of the target speed Nt (the change amount of the speed N varying so as to follow the target speed Nt) reflects on the deviation AN. Thus, in the embodiment, during the time period (between the time t1 and the time t2) in which the target speed Nt substantially varies, degradation of accuracy of the entrapment detection can be prevented.

On the other hand, as illustrated with a dashed line in FIG. 5, when the speed N rapidly and continuously varies in response to the entrapment of the object, the level of the deviation AN is significantly reduced so as to be lower than the predetermined threshold ANth at the time t, and the entrapment is detected at this point.

A detecting manner of the entrapment that happens during the opening operation of the back door 1 is basically the same as that in the closing operation, except the direction of the movement of the back door 1. A detailed explanation of the detecting manner during the opening operation is omitted here.

(1) According to the embodiment, because the deviation AN related to the entrapment detection is calculated by use of the speed difference change amount $\Delta DN$ on the basis of the speed difference DN between the actual speed N of the electric motor 5 and the target speed Nt, the change amount of the target speed Nt (the change amount of the speed N that changes so as to follow the target speed Nt) is prevented from reflecting on the deviation AN, as a result, an error of the entrapment detection by the CPU 11 can be restrained. Further, even when the speed of the movement of the back door 1 changes little and slowly, the error of the entrapment detection by the CPU 11 can also be restrained. Furthermore, the CPU 11 accurately detects an entrapment on the basis of the speed N varying rapidly and continuously. This speed variation corresponds to a characteristic of the speed of the electric motor 5 when an object is actually entrapped by the back door 1.

(2) According to the embodiment, because the deviation AN related to the entrapment detection is calculated by weighting the current speed difference change amount $\Delta DN(n)$ with the previous deviation AN (n−1) calculated a predetermined time before, in other words with the speed difference change amount $\Delta DN$ sequentially calculated by the previous cycle, even when a pulsing motion instantaneously occurs at the speed N of the electric motor 5, specifically a pulsing motion instantaneously occurs at the speed difference DN, due to a disturbance, the pulsing motion can be appropriately absorbed during the calculation of the deviation AN. As a result, the accuracy of the entrapment detection by the CPU 11 can further be improved.

(3) According to the embodiment, the speed difference change amount $\Delta DN$ is integrated and averaged, and the entrapment is detected after a certain accumulated time passes. Thus, an error of the entrapment detection caused by, for example, an instantaneous disturbance or a minor vibration (noise) at the back door 1, can be restrained, as a result, the entrapment of the object by the back door can be detected more accurately.

(4) According to the embodiment, even when the target speed Nt varies depending on the position of the back door, the threshold ANth is set to a constant value. Specifically, there is no need to design this control device so as to set and adjust the threshold ANth in accordance with the variation of the target speed Nt. In other words, the target speed Nt is freely set depending on the position of the door, without considering the accuracy of the entrapment detection by use of the deviation AN.

(5) According to the embodiment, the opening/closing operation of the back door 1 is executed by the feedback control of the electric motor 5 on the basis of the target speed Nt varying in accordance with the position of the back door 1, so that a sense of exclusivity can be provided, and a load applied by the back door 1 to the object at the final stage of the closing operation of the back door 1 can be reduced. At the final stage of the closing operation of the back door 1, the entrapment of the object by the back door 1 often happens.

The embodiment may be modified as follows. In the embodiment, the target speed related to the calculation of the speed difference DN may be a speed obtained by off-setting an experimentally predetermined amount of the pulsing motion on the speed N from the target speed Nt related to the feed back control. In this case, in the calculation of the deviation AN, a pulsing motion having a reproducibility of the speed N, specifically an amount of a specific pulsing motion in accordance with the opening/closing operation of the back door, can be absorbed in advance, as a result, an influence of the amount of the pulsing motion on the entrapment detection by use of the deviation AN can securely be restrained.

In the embodiment, when the deviation AN(n) is calculated, the previous deviation AN(n−1), specifically all speed difference change amounts ($\Delta DN$) calculated by the previous cycle, is used, however, the predetermined number of times (e.g., ten times) of the speed difference change amount, which have been calculated by the previous calculation cycle may be used alternatively.

The entrapment detection by use of the deviation may be started after a predetermined time period passes. For example, during the predetermined time period, the speed difference change amounts ($\Delta DN$) related to the calculation of the deviation have been accumulated the predetermined number of times (e.g., ten times).

In this modified configuration, the accuracy of the entrapment detection by use of the deviation may further be improved.

In the embodiment, the ratio of the weighting on the speed difference change amount $\Delta DN(n)$ related to the calculation of the deviation AN(n) and the previous deviation AN(n−1) is 1:99, however, this ratio may be modified in accordance to a level of each value.

The entrapment may also be detected when the speed N becomes lower than the predetermined threshold. In this case, the process (entrapment controlling process) may be executed when both of the entrapment detection, by use of the deviation AN and the entrapment detection by use of the speed N, are established, or when one of the entrapment detection by use of the deviation AN or the entrapment detection by use of the speed N is established. In this modified configuration, the entrapment is detected when the speed N becomes lower than the threshold, specifically when the speed N is significantly reduced. Thus, the accuracy of the entrapment detection may be improved rather than a case where the entrapment is detected by use of, for example, only the deviation AN.

In the embodiment, the entrapment is detected by comparing the deviation AN to the threshold ANth, however, the entrapment may be detected by, for example, comparing a value, which is obtained by dividing the deviation AN by the threshold ANth (AN/ANth), to "1".

Even when the detecting manner of an apparent entrapment is changed in such a way that the calculation is executed by use of the deviation AN and the threshold ANth, because the deviation AN is substantially compared to the threshold ANth, the control apparatus does not exceed the scope of the invention.

A potentiometer may be used as the speed detecting means for detecting the speed N of the electric motor 5. A clutch may be provided between the rotation shaft of the electric motor 5 and the deceleration mechanism 6 or between the rotation shaft of the electric motor 5 and the arm member 7, in order to connect or disconnect the transmission of the rotation from the electric motor 5 to the deceleration mechanism 6 or the arm member 7. In this way, by connecting or disconnecting the drive transmission, when the back door 1 is manually operated so as to be opened/closed, a smooth operation can be achieved.

In the feed back control for the electric motor 5, the output duty value DUTY may be adjusted in consideration of an actual voltage V of the battery voltage+B.

In the feed back control for the electric motor 5, an adjusting range for the output duty value DUTY may be modified in accordance with the amounts of the speed N and the target speed Nt.

In the embodiment, the electric motor is controlled (feedback controlled) in a manner where the speed N reaches the target speed Nt, however, the electric motor may be controlled in a manner where the speed of the opening/closing operation of the back door based upon the speed N reaches a target opening/closing speed of the back door 1 corresponding to the target speed Nt. Further, when a sensor for directly detecting the speed of the opening/closing operation of the back door 1, the electric motor 5 may be controlled in a manner where the detected speed reaches the target opening/closing speed of the back door 1 corresponding to the target speed Nt. Specifically, in each configuration, the speed of the electric motor 5 and the opening/closing speed of the back door 1 basically has a constant relation, these configurations do not exceed the scope of the invention.

The control apparatus may be applied to a sliding back door, a door provided at a side of the vehicle (a swing-type door, a slide-type door or the like), a lid for a trunk, a sunroof or a window.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control apparatus for an opening/closing member of a vehicle comprising:
    a driving member for moving an opening/closing member for a vehicle;
    speed detecting means for detecting a drive speed of the driving member; and
    control means for controlling the driving member in a manner where the detected drive speed of the driving member follows a predetermined target drive speed,
    wherein the control means calculates a current speed difference between the detected drive speed of the driving member and the predetermined target drive speed, calculates a current change amount between the current speed difference and a previous speed difference calculated a predetermined time before, calculates a current deviation by integrating the current change amount with a previous deviation calculated a predetermined time before, and detects an entrapment of an object by comparing the current deviation to a predetermined threshold.

2. The control apparatus according to claim 1, wherein the control means calculates the current deviation by averaging the current change amount and a previous deviation calculated the predetermined time before.

3. The control apparatus according to claim 1, wherein the control means calculates the current deviation by weighting the current change amount with a previous deviation calculated the predetermined time before.

4. The control apparatus according to claim 1, wherein the control means controls the driving member in a manner where the detected drive speed of the driving member follows the target drive speed.

5. The control apparatus according to claim 4, wherein, once the entrapment is detected, the control means controls the driving member so as to stop or make a reverse movement.

6. The control apparatus according to claim 1, wherein the target drive speed includes at least two ranges at which the target drive speed is different.

7. The control apparatus according to claim 1, wherein the target drive speed includes a constant speed range in which the target drive speed is constant and an accelerating speed range in which the target drive speed increases.

8. The control apparatus according to claim 1, wherein the target drive speed includes a constant speed range in which the target drive speed is constant and a decelerating speed range in which the target drive speed decreases.

9. The control apparatus according to claim 1, wherein the target drive speed includes a range in which the target drive speed changes.

10. A control method for an opening/closing member of vehicle comprising:
    detecting a drive speed of a driving member by which an opening/closing member for a vehicle is moved;
    controlling the driving member in a manner where the detected drive speed of the driving member follows a predetermined target drive speed;
    calculating a current speed difference between the detected drive speed of the driving member and the predetermined target drive speed;
    calculating a current change amount between the current speed difference and a previous speed difference calculated a predetermined time before;
    calculating a current deviation by integrating the current change amount with a previous deviation calculated a predetermined time before; and
    detecting an entrapment of an object by comparing the current deviation to a predetermined threshold.

11. The control method according to claim 10, wherein deviation calculating step calculates the current deviation by averaging the current change amount and a previous deviation calculated the predetermined time before.

12. The control method according to claim 10, wherein the deviation calculating step calculates the current deviation by weighting the current change amount with a previous deviation calculated the predetermined time before.

13. The control method according to claim 10, wherein the predetermined target drive speed includes at least two ranges at which the predetermined target drive speed is different.

14. The control method according to claim 10, wherein the predetermined target drive speed includes a constant speed range in which the predetermined target drive speed is constant and an accelerating speed range in which the predetermined target drive speed increases.

15. The control method according to claim 10, wherein the predetermined target drive speed includes a constant speed range in which the predetermined target drive speed is constant and a decelerating speed range in which the predetermined target drive speed decreases.

16. The control method according to claim 10, wherein the predetermined target drive speed includes a range in which the predetermined target drive speed changes.

17. A control apparatus for an opening/closing member of a vehicle comprising:
   a driving member for moving an opening/closing member for a vehicle;
   speed detecting means for detecting a drive speed of the driving member; and
   control means for controlling the driving member in a manner where the detected drive speed of the driving member follows a predetermined target drive speed,
   wherein the control means for calculates a current speed difference between the detected drive speed of the driving member and the predetermined target drive speed, which is preset at a speed greater than zero before movement of the opening/closing member begins, calculates a current change amount by subtracting a previous speed difference calculated a predetermined time before from the current speed difference, calculates a current deviation by integrating the current change amount with a previous deviation calculated a predetermined time before, and detects an entrapment of an object by comparing the current deviation to a predetermined threshold.

18. A control apparatus according to claim 17, wherein the target drive speed which is preset before movement of the opening/closing member begins includes at least two ranges at which the preset speed is different.

19. A control apparatus according to claim 17, wherein the target drive speed which is preset before movement of the opening/closing member begins includes a constant speed range in which the preset speed is constant and an accelerating speed range in which the preset speed increases.

20. A control apparatus according to claim 17, wherein the target drive speed which is preset before movement of the opening/closing member begins includes a constant speed range in which the preset speed is constant and a decelerating speed range in which the preset speed decreases.

* * * * *